United States Patent
Grimble et al.

(10) Patent No.: US 10,866,816 B2
(45) Date of Patent: Dec. 15, 2020

(54) METHOD AND APPARATUS FOR AUTOMATED FEED PROCESSING

(71) Applicant: JPMorgan Chase Bank, N.A., New York, NY (US)

(72) Inventors: Andrew Grimble, Tampa, FL (US); Shyamal J. Shah, Wesley Chapel, FL (US); Denzel Mathew, Tampa, FL (US); Dave Fetzer, Chicago, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 190 days.

(21) Appl. No.: 16/224,076

(22) Filed: Dec. 18, 2018

(65) Prior Publication Data

US 2020/0192681 A1     Jun. 18, 2020

(51) Int. Cl.
  *G06F 9/445*   (2018.01)
  *G06F 9/54*    (2006.01)
  *G06F 9/455*   (2018.01)
  *H04L 29/08*   (2006.01)

(52) U.S. Cl.
  CPC .......... *G06F 9/44505* (2013.01); *G06F 9/455* (2013.01); *G06F 9/54* (2013.01); *H04L 67/06* (2013.01)

(58) Field of Classification Search
  CPC ........ G06F 9/44505; G06F 9/455; G06F 9/54; H04L 67/06
  See application file for complete search history.

(56) References Cited

U.S. PATENT DOCUMENTS

| | | | | |
|---|---|---|---|---|
| 2010/0076937 A1* | 3/2010 | Abdelnur | ............... | G06F 16/958 707/679 |
| 2011/0276707 A1* | 11/2011 | Mast | ...................... | G06Q 40/04 709/230 |
| 2013/0054688 A1* | 2/2013 | Rourke | ............... | G06F 16/2228 709/204 |
| 2014/0105208 A1* | 4/2014 | Pope | ..................... | G06F 13/385 370/390 |
| 2014/0359119 A1* | 12/2014 | Spaven | ................... | H04L 67/26 709/224 |
| 2015/0149420 A1* | 5/2015 | Lee | ..................... | G06F 16/2365 707/690 |

* cited by examiner

*Primary Examiner* — Nimesh G Patel

(74) *Attorney, Agent, or Firm* — Greenblum & Bernstein, P.L.C.

(57) ABSTRACT

Various methods, apparatuses, and media for processing feed data are provided. The methodology includes operations of receiving a data file, receiving a configuration file that includes configuration instructions, extracting the configurations from the configuration file, generating a customized set of feed processing instructions by combining the configuration instructions with a standard framework set of instructions, and processing the data file by executing the customized set of instructions.

20 Claims, 5 Drawing Sheets

METHOD AND APPARATUS FOR AUTOMATED FEED PROCESSING

BACKGROUND

1. Field of the Disclosure

This technology generally relates to processing feeds of data, and more particularly, to methods and apparatuses for automating a generation of a feed processing application.

2. Background Information

Feed processing generally relates to processing of text files that include rows of data where each row contains a number of values. The format of the data is typically predictable and fixed, and thus, a feed processing application may be created for reading and processing a set of files that belong to a particular feed. Such a feed processing application may typically perform operations of reading the data from the file, parsing the data, collecting the data into data objects in a memory, validating the data, processing the data, and then outputting the processed data.

In some situations, a new feed type may be similar to an existing feed type for which a feed processing application has previously been developed. However, the new feed type may have slight differences from the existing feed type, and although the differences may be relatively minor, a new feed processing application is generally required, and the development thereof may be relatively time consuming. As a result, there is a need for simplifying and automating a development of a feed processing application.

SUMMARY

The present disclosure, through one or more of its various aspects, embodiments, and/or specific features or sub-components, provides, inter alia, various systems, servers, devices, methods, media, programs, and platforms for automating a generation of a feed processing application. The various aspects, embodiments, features, and/or sub-components provide optimized processes of processing feed data based on combining a common framework application with a particularized set of configuration instructions in order to create a customized application, and executing the customized application in order to process the feed data.

According to an aspect of the present disclosure, a method for processing feed data is provided. The method includes: receiving a first data file that includes a plurality of rows, each row including a plurality of data items; accessing a first configuration file that includes at least one first configuration instruction; extracting each of the at least one first configuration instruction from the accessed first configuration file; generating a first customized set of computer-readable feed processing instructions by combining each of the extracted at least one first configuration instruction with a predetermined framework set of computer-readable data processing instructions; processing the received first data file by executing the first customized set of feed processing instructions with respect to the received first data file; and outputting a result of the processing the received first data file.

The method may further include dividing the received first data file into a plurality of component files. The processing of the received data file may further include concurrently processing each of the plurality of component files by using a parallel-processing computer architecture in order to generate a plurality of partial output files, and combining the plurality of partial output files into a single composite output file.

The method may further include performing, before the dividing the received first data file into the plurality of component data files, at least one preprocessing function with respect to the received first data file; and performing, after the combining the plurality of partial output files into the single composite output file, at least one postprocessing function with respect to the single composite output file.

The method may further include applying at least one gatekeeper function to the received first data file in order to determine whether the received first data file is in a proper condition for processing. The at least one gatekeeper function may include at least one from among checking a business date, checking a status table, and checking whether a previous feed has been processed in advance.

The method may further include: accessing a second configuration file that includes at least one second configuration instruction; extracting each of the at least one second configuration instruction from the accessed second configuration file; generating a second customized set of computer-readable feed processing instructions by combining each of the extracted at least one second configuration instruction with the predetermined framework set of computer-readable data processing instructions; processing a second data file by executing the second customized set of feed processing instructions with respect to the second data file; and outputting a result of the processing the second data file.

The method may further include: accessing a second configuration file that includes at least one second configuration instruction and at least a third configuration file that includes at least one respective configuration instruction; extracting each of the at least one second configuration instruction from the accessed second configuration file, and extracting, from each of the at least the third configuration file, each of the at least one respective configuration instruction; generating a second customized set of computer-readable feed processing instructions by combining each of the extracted at least one second configuration instruction with the predetermined framework set of computer-readable data processing instructions, and generating, for each of the at least the third configuration file, a respective customized set of computer-readable feed processing instructions by combining each of the extracted at least one respective configuration instruction for the corresponding configuration file with the predetermined framework set of computer-readable data processing instructions; processing a second data file by executing the second customized set of feed processing instructions with respect to the second data file, and processing, for each respective customized set of computer-readable feed processing instructions, a corresponding input data file; and outputting each of a respective set of results of the processing the second data file and each corresponding input data file.

According to another aspect of the present disclosure, a feed processing device configured to process feed data is provided. The feed processing device includes a communication interface and a first processor. The first processor is configured to: receive, via the communication interface, a first data file that includes a plurality of rows, each row including a plurality of data items; access, via the communication interface, a first configuration file that includes at least one first configuration instruction; extract each of the at least one first configuration instruction from the accessed first configuration file; generate a first customized set of computer-readable feed processing instructions by combining each of the extracted at least one first configuration instruction with a predetermined framework set of computer-readable data processing instructions; process the received first data file by executing the first customized set of feed processing instructions with respect to the received first data file; and output, via the communication interface, a result of processing the received first data file.

The first processor may be further configured to: divide the received first data file into a plurality of component files; transmit each of the plurality of component files to a respective component processor that is configured to process the corresponding component file in order to generate a respective partial output file; receive each respective partial output file from each respective component processor; and combine each respective partial output file into a single output file. Each respective component processor may be arranged in a parallel processing architecture and may be further configured to concurrently process the corresponding component file.

The first processor may be further configured to perform, before dividing the received first data file into the plurality of component data files, at least one preprocessing function with respect to the received first data file; and perform, after combining the plurality of partial output files into the single composite output file, at least one postprocessing function with respect to the single composite output file.

The first processor may be further configured to apply at least one gatekeeper function to the received first data file in order to determine whether the received first data file is in a proper condition for processing. The at least one gatekeeper function may include at least one from among checking a business date, checking a status table, and checking whether a previous feed has been processed in advance.

The first processor may be further configured to: access, via the communication interface, a second configuration file that includes at least one second configuration instruction; extract each of the at least one second configuration instruction from the accessed second configuration file; generate a second customized set of computer-readable feed processing instructions by combining each of the extracted at least one second configuration instruction with the predetermined framework set of computer-readable data processing instructions; process a second data file by executing the second customized set of feed processing instructions with respect to the second data file; and output, via the communication interface, a result of processing the second data file.

The first processor may be further configured to: access, via the communication interface, a second configuration file that includes at least one second configuration instruction and at least a third configuration file that includes at least one respective configuration instruction; extract each of the at least one second configuration instruction from the accessed second configuration file, and extract, from each of the at least the third configuration file, each of the at least one respective configuration instruction; generate a second customized set of computer-readable feed processing instructions by combining each of the extracted at least one second configuration instruction with the predetermined framework set of computer-readable data processing instructions, and generate, for each of the at least the third configuration file, a respective customized set of computer-readable feed processing instructions by combining each of the extracted at least one respective configuration instruction for the corresponding configuration file with the predetermined framework set of computer-readable data processing instructions; process a second data file by executing the second customized set of feed processing instructions with respect to the second data file, and process, for each respective customized set of computer-readable feed processing instructions, a corresponding input data file; and output, via the communication interface, each of a respective set of results of processing the second data file and each corresponding input data file.

According to yet another aspect of the present disclosure, a non-transitory computer readable medium configured to store instructions for implementing a method for processing feed data is provided. When executed, the instuctions cause a computer to: receive a first data file that includes a plurality of rows, each row including a plurality of data items; access a first configuration file that includes at least one first configuration instruction; extract each of the at least one first configuration instruction from the accessed first configuration file; generate a first customized set of computer-readable feed processing instructions by combining each of the extracted at least one first configuration instruction with a predetermined framework set of computer-readable data processing instructions; process the received first data file by executing the first customized set of feed processing instructions with respect to the received first data file; and output a result of the processing the received first data file.

The instructions may further cause the computer to: divide the received first data file into a plurality of component files; concurrently process each of the plurality of component files by using a parallel-processing computer architecture in order to generate a plurality of partial output files; and combine the plurality of partial output files into a single composite output file.

The instructions may further cause the computer to: perform, before dividing the received first data file into the plurality of component data files, at least one preprocessing function with respect to the received first data file; and perform, after combining the plurality of partial output files into the single composite output file, at least one postprocessing function with respect to the single composite output file.

The instructions may further cause the computer to apply at least one gatekeeper function to the received first data file in order to determine whether the received first data file is in a proper condition for processing. The at least one gatekeeper function includes at least one from among checking a business date, checking a status table, and checking whether a previous feed has been processed in advance.

The instructions may further cause the computer to: access a second configuration file that includes at least one second configuration instruction and at least a third configuration file that includes at least one respective configuration instruction; extract each of the at least one second configuration instruction from the accessed second configuration file, and extract, from each of the at least the third configuration file, each of the at least one respective configuration instruction; generate a second customized set of computer-readable feed processing instructions by combining each of the extracted at least one second configuration instruction with the predetermined framework set of computer-readable data processing instructions, and generate, for each of the at least the third configuration file, a respective customized set of computer-readable feed processing instructions by combining each of the extracted at least one respective configuration instruction for the corresponding configuration file with the predetermined framework set of computer-readable data processing instructions; process a second data file by executing the second customized set of feed processing instructions with respect to the second data file, and process, for each respective customized set of computer-readable feed processing instructions, a corresponding input data file; and output each of a respective set of results of the processing the second data file and each corresponding input data file.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
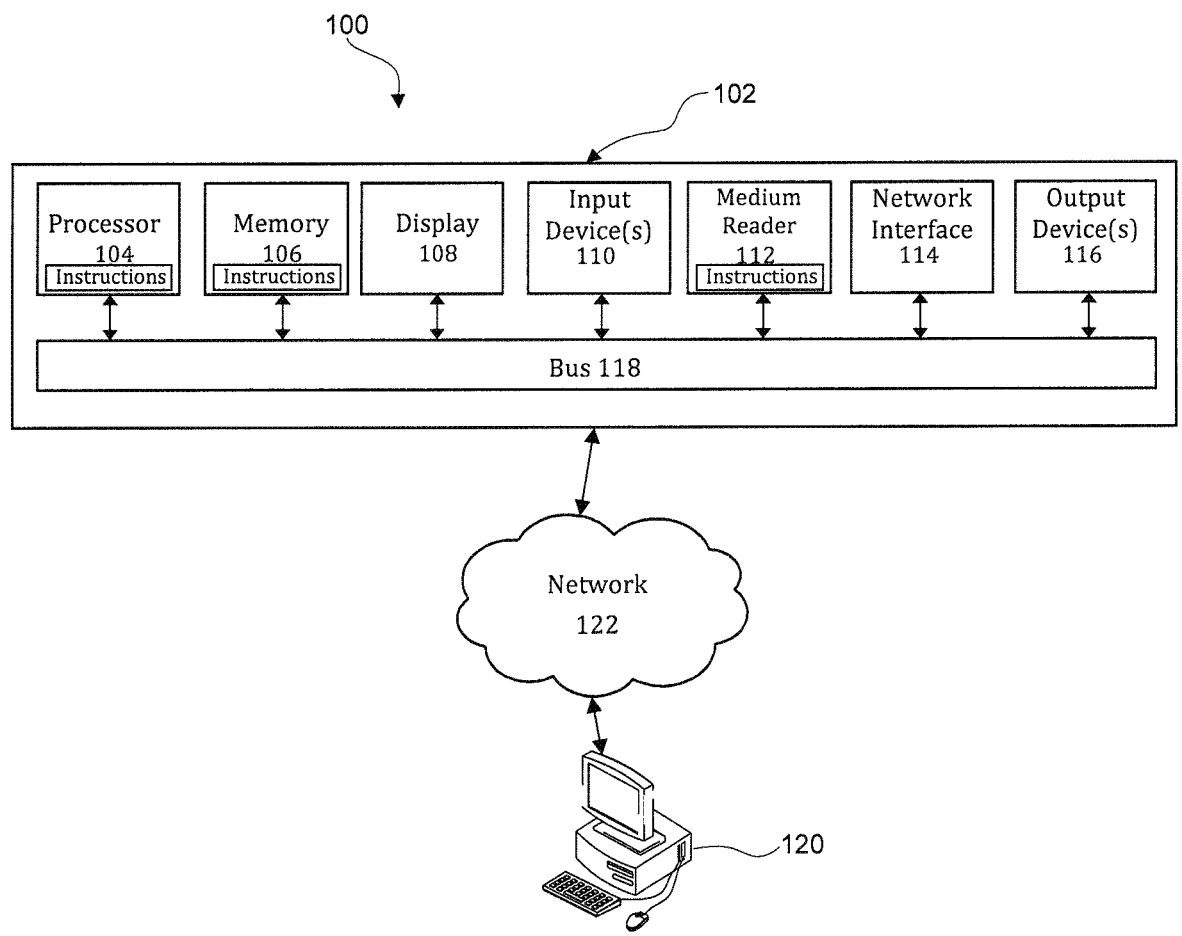
FIG. 1 illustrates an exemplary computer system for processing feed data.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, bluray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a video display 108, such as a liquid crystal display (LCD), an organic light emitting diode (OLED), a flat panel display, a solid state display, a cathode ray tube (CRT). a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present disclosure. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of automating a generation of a customized feed processing application and processing feed data by executing the application.

Figure 2:
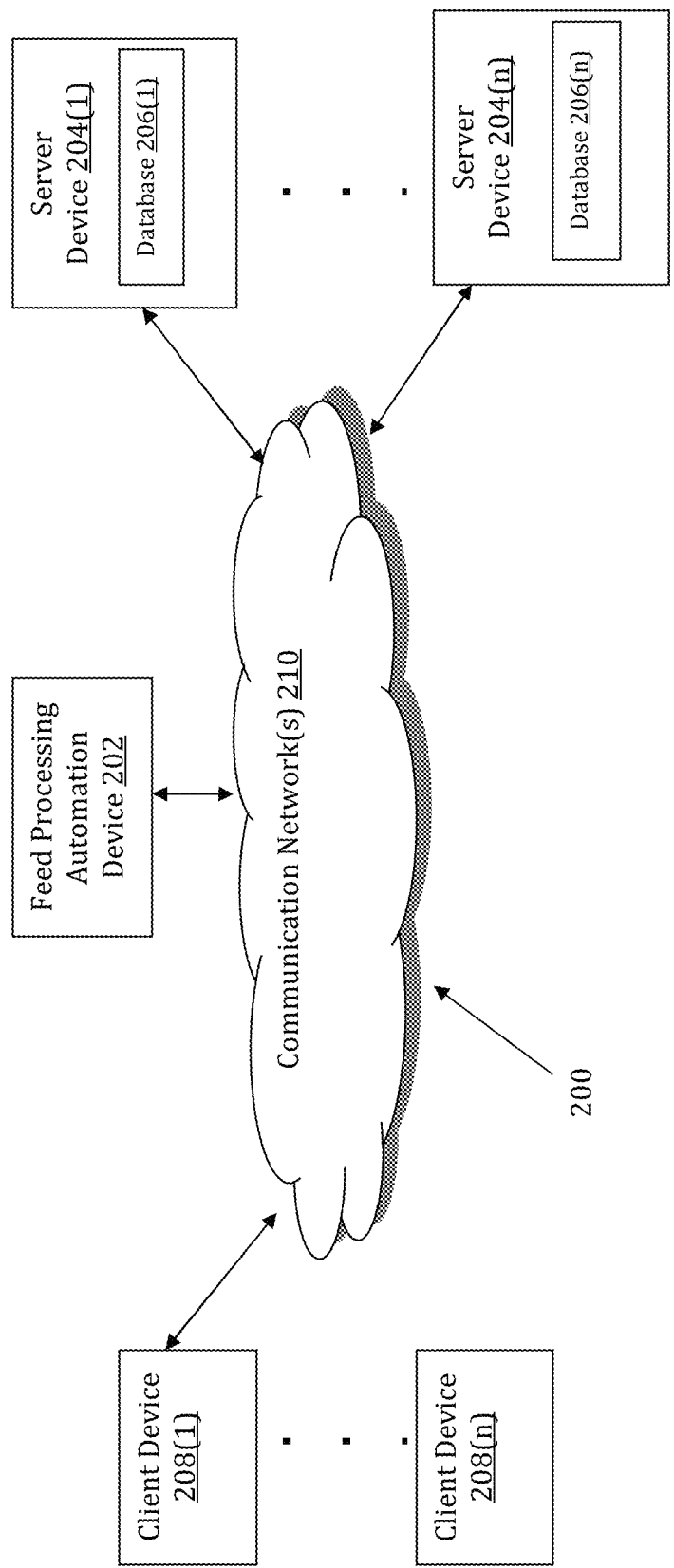
FIG. 2 illustrates an exemplary diagram of a network environment with a feed processing automation device.

Referring to FIG. 2, a schematic of an exemplary network environment 200 for automating a generation of a customized feed processing application is illustrated. The customized feed processing application is generated by combining a framework set of processing instructions with particularized configuration instructions that are determined by using configuration annotations that are specific to a particular feed type.

The generation of the customized feed processing application may be facilitated by a Feed Processing Automation (FPA) device 202. The FPA device 202 may be the same or similar to the computer system 102 as described with respect to FIG. 1. The FPA device 202 may store one or more applications that can include executable instructions that, when executed by the FPA device 202, cause the FPA device 202 to perform actions, such as to transmit, receive, or otherwise process network messages, for example, and to perform other actions described and illustrated below with reference to the figures. The application(s) may be implemented as modules or components of other applications.

Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the FPA device 202 itself, may be located in virtual server(s) running in a cloud-based computing environment rather than being tied to one or more specific physical network computing devices. Also, the application(s) may be running in one or more virtual machines (VMs) executing on the FPA device 202. Additionally, in one or more embodiments of this technology, virtual machine(s) running on the FPA device 202 may be managed or supervised by a hypervisor.

In the network environment 200 of FIG. 2, the FPA device 202 is coupled to a plurality of server devices 204(1)-204(n) that hosts a plurality of databases 206(1)-206(n), and also to a plurality of client devices 208(1)-208(n) via communication network(s) 210. A communication interface of the FPA device 202, such as the network interface 114 of the computer system 102 of FIG. 1, operatively couples and communicates between the FPA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the FPA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and PM devices that efficiently generate and manage metadata in order to automatically facilitate generate new data.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The FPA device 202 may be a standalone device or integrated with one or more other devices or apparatuses, such as one or more of the server devices 204(1)-204(n), for example. In one particular example, the FPA device 202 may include or be hosted by one of the server devices 204(1)-204(n), and other arrangements are also possible. Moreover, one or more of the devices of the FPA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the FPA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can facilitate the generation of price quote requests, such as in response to user interaction with graphical user interfaces for example. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the FPA device 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the FPA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the FPA device 202, the server devices 204(1)-204(n), or the client devices 208(1)-208(n), for example, may be configured to operate as virtual instances on the same physical machine. In other words, one or more of the FPA device 202, the server devices 204(1)-204(n), or the client devices 208(1)-208(n) may operate on the same physical device rather than as separate devices communicating through communication network(s) 210. Additionally, there may be more or fewer FPA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
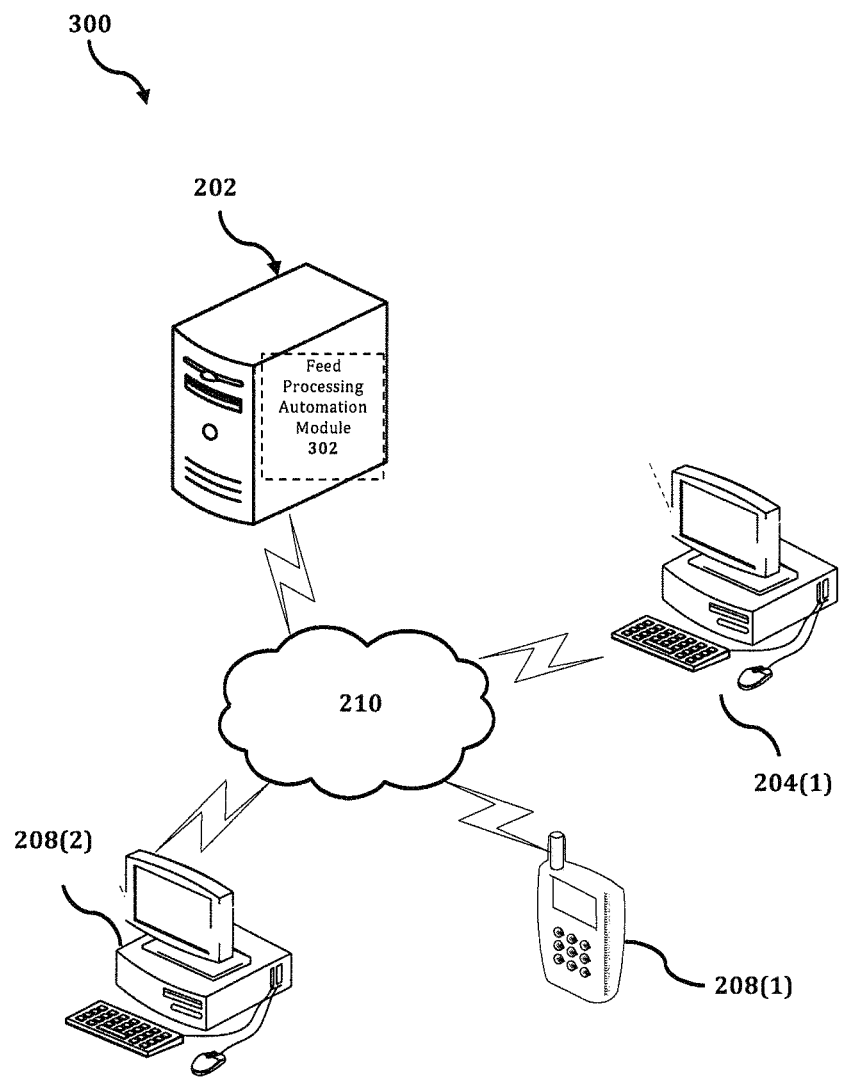
FIG. 3 shows an exemplary system for automating a generation of a feed processing application based on combining a common framework application with a particularized set of configuration instructions in order to create a customized application.

The FPA device 202 is described and shown in FIG. 3 as including a feed processing automation module 302, although it may include other rules, policies, modules, databases, or applications, for example. As will be described below, the feed processing automation module 302 is configured to generate a customized feed processing application. The customized feed processing application is generated based on configuration annotations that are specific to a particular feed type.

An exemplary process 300 for generating a customized feed application by utilizing the network environment of FIG. 2 is shown as being conducted in FIG. 3. Specifically, a first client device 208(1) and a second client device 208(2) are illustrated as being in communication with FPA device 202. In this regard, the first client device 208(1) and the second client device 208(2) may be "clients" of the FPA device 202 and are described herein as such. Nevertheless, it is to be known and understood that the first client device 208(1) and/or the second client device 208(2) need not necessarily be "clients" of the FPA device 202, or any entity described in association therewith herein. Any additional or alternative relationship may exist between either or both of the first client device 208(1) and the second client device 208(2) and the FPA device 202, or no relationship may exist.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the FPA device 202 via broadband or cellular communication. Of course, these embodiments are merely exemplary and are not limiting or exhaustive.

Upon being started, the feed processing automation module 302 executes a process for generating a customized feed processing application. An exemplary process for generating a customized feed processing application and processing feed data therewith is generally indicated at flowchart 400 in FIG. 4.

Figure 4:
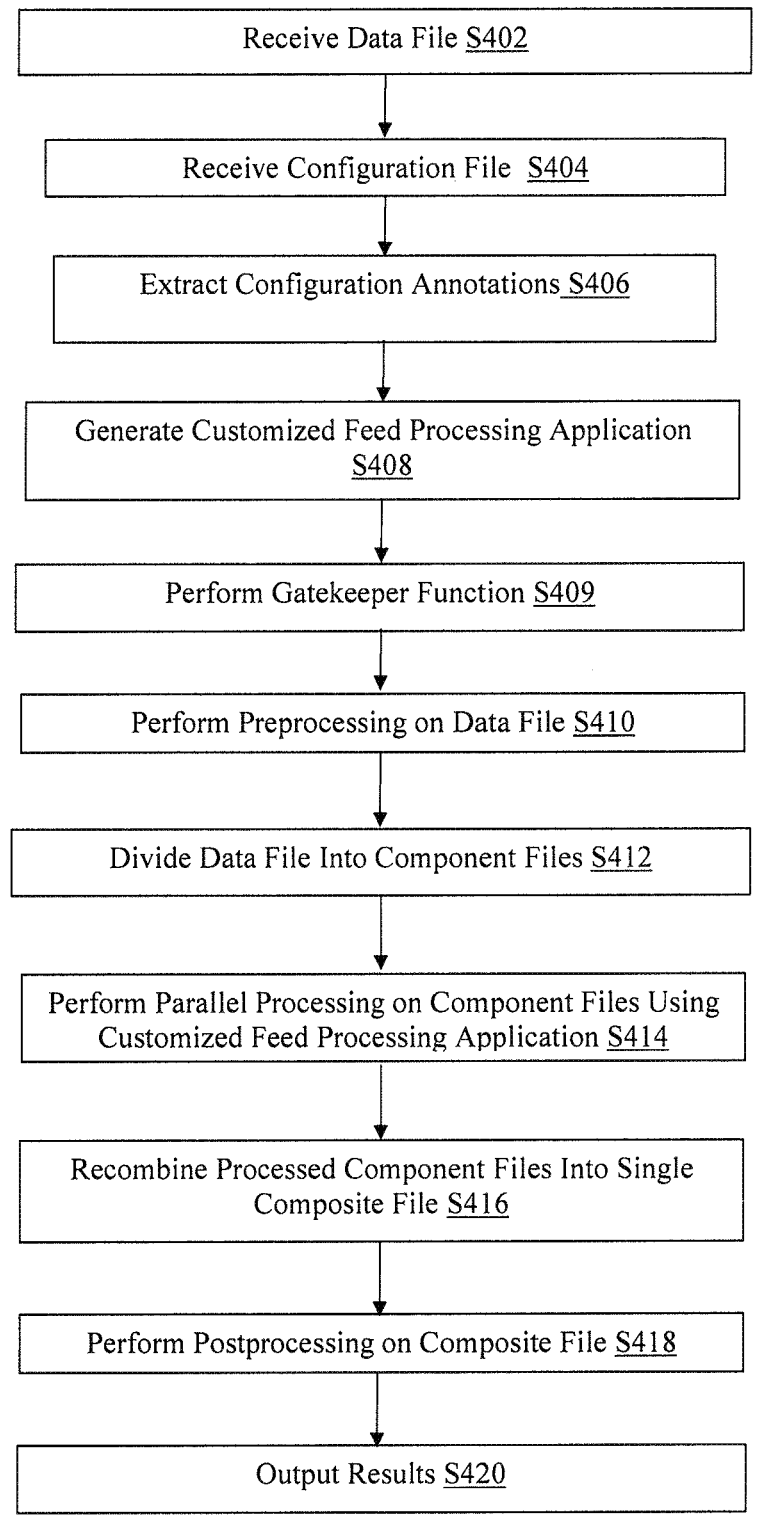
FIG. 4 is a flowchart of an exemplary process for processing feed data based on combining a common framework application with a particularized set of configuration instructions in order to create a customized application.

In the process 400 of FIG. 4, a data file that includes feed data is received from a client device 208 at step S402. The data file will generally be a text file that includes rows of data, where each row contains a number of numerical values.

At step S404, a configuration file is received from a client device 208. The configuration file includes configuration annotations that are specific to the particular type of feed data to be processed.

At step S406, the feed processing automation module 302 extracts the configuration annotations. By extracting the configuration annotations, a determination may be made regarding specific configuration instructions to be implemented for the particular type of feed data to be processed.

At step S408, the feed processing automation module 302 generates a customized feed processing application for the particular type of feed data to be processed. The customized application is generated by combining a predetermined framework set of computer-readable data processing instructions with the configuration instructions that are determined from the extracted configuration annotations. In this regard, the predetermined framework set of instructions may be embodied as a standard software module that is generally applicable to a wide range of feed data types, and the configuration instructions provide the additional information that is required for customizing the application to the particular type of feed data to be processed.

At step S409, a gatekeeper function is applied to the input data file. In particular, the feed processing automation module 302 performs a gatekeeper function in order to check whether the input data file is in a proper condition for processing. The gatekeeper function may include at least one from among checking a business date, checking a status table, and checking whether a previous feed has been processed in advance, in case that an ordered sequence of feeds is required or desired.

At step S410, the feed processing automation module 302 performs one or more preprocessing operations on the input data file. In this regard, the preprocessing operations may include any function that is intended to be performed in advance of the main feed processing functions.

At step S412, the input data file is divided into a plurality of component files, in order to facilitate parallel processing operations for the file; and at step S414, the customized feed processing application is applied to each component file in order to implement the feed processing functions in a parallel-processing manner. In particular, the main feed processing operations may be computationally intensive and therefore relatively time consuming, and as a result, by dividing the input file into smaller component files for parallel processing thereof, the overall processing time may be significantly reduced.

At step S416, when the parallel feed processing operations are completed, the processed component files are recombined into a single composite data file. Then, at step S418, the feed processing automation module 302 performs one or more postprocessing operations on the composite file. The postprocessing operations may function that is intended to be performed after the main feed processing functions are completed. For example, the postprocessing operations may include updating the processing status of the overall feed process.

At step S420, the resulting postprocessed composite data file is outputted. The outputting of the results may include transmitting the result to any desired destination, such as, for example, a client device 208, or a database 206 that is associated with a server device 204. The outputting of the results may also include displaying at least a subset of the data included in the composite file on a computer screen of a client device 208, such as, for example, a graphical representation of selected data that is desired by a particular user, or a tabular listing of selected data, which can then be printed out as a hard copy or further disseminated by the user as desired.

The process 400 lends itself to a circumstance in which a plurality of different types of feed data may be received. In this circumstance, the feed processing automation module 302 may generate a separate customized feed processing application for each separate type of feed data, based on the specific configuration annotations that accompany the corresponding feed data. As a result, the generation of the customized feed processing application may be implemented in an automated and efficient manner.

Figure 5:
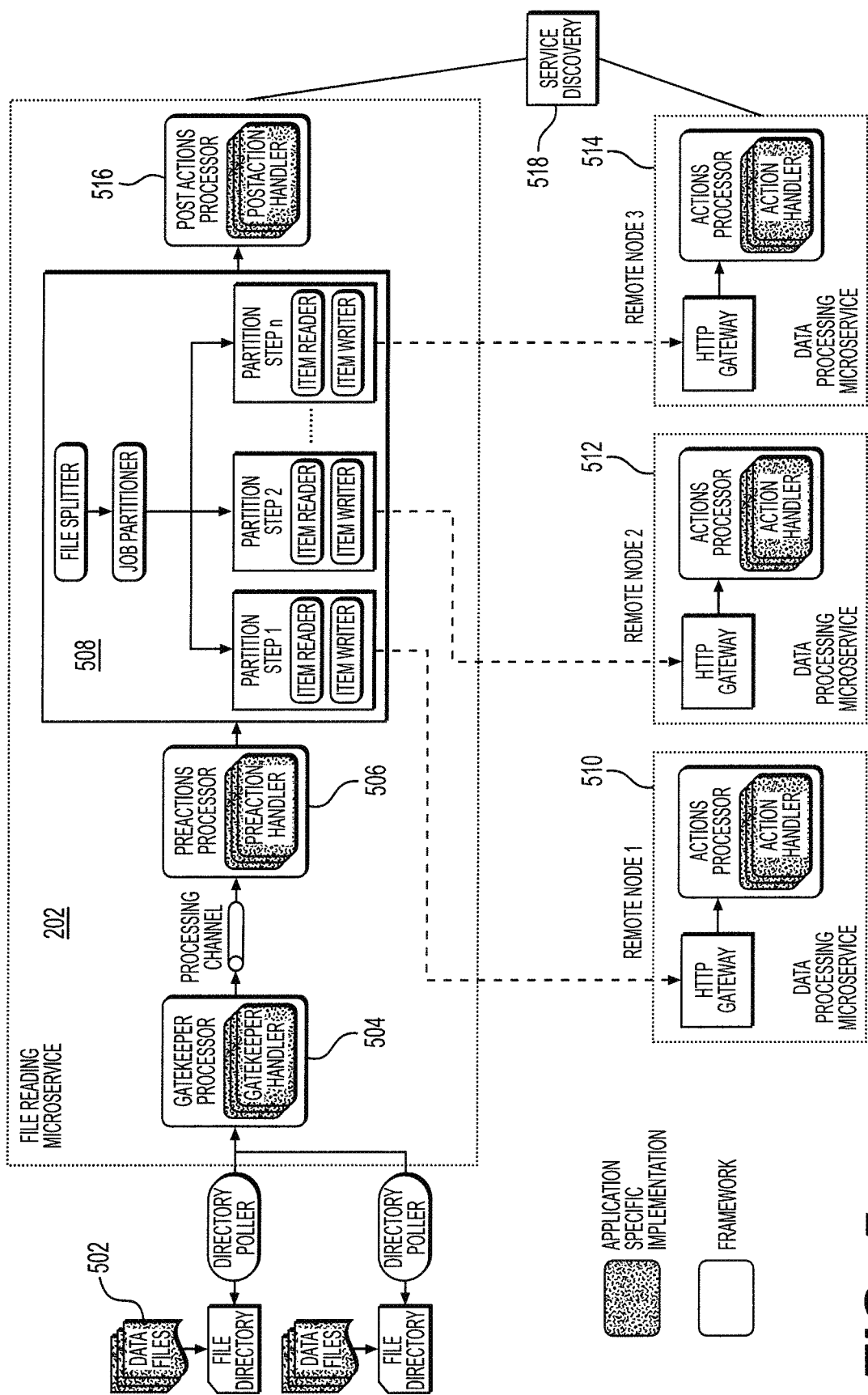
FIG. 5 is a data flow diagram that illustrates an exemplary process for processing feed data by using a parallel processing architecture and executing a customized feed processing application according to an exemplary embodiment.

Referring to FIG. 5, a data flow diagram 500 that illustrates an exemplary process for processing feed data by using a parallel processing architecture and executing a customized feed processing application according to an exemplary embodiment is provided. At 502, the input data files are provided to the feed processing automation device 202. At 504, a gatekeeper function is applied to the input data files, and at 506, additional preprocessing functions are applied to the input data files. At 508, the input data files are partitioned into three component files, which are then forwarded to remote nodes 510, 512, and 514 for parallel processing of the data. The remote nodes 510, 512, 514 execute the customized feed processing application for the particular feed data type, and when completed, the processed component files are recombined into a single composite file by the feed processing automation device 202. At 516, postprocessing functions are performed with respect to the composite file, and at 518, the resulting file is outputted.

Accordingly, with this technology, an optimized process for automating processing of feed data is provided. The optimized process enables a generation of a customized feed processing application based on applying configuration annotations to a feed processing framework, thereby avoiding a need to create such an application on an ad hoc basis.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended' to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for processing feed data, comprising:
receiving a first data file that includes a plurality of rows, each row including a plurality of data items;
accessing a first configuration file that includes at least one first configuration instruction;
extracting each of the at least one first configuration instruction from the accessed first configuration file;
generating a first customized set of computer-readable feed processing instructions by combining each of the extracted at least one first configuration instruction with a predetermined framework set of computer-readable data processing instructions;
processing the received first data file by executing the first customized set of feed processing instructions with respect to the received first data file; and
outputting a result of the processing the received first data file.

2. The method of claim 1, further comprising dividing the received first data file into a plurality of component files,
wherein the processing the received data file comprises concurrently processing each of the plurality of component files by using a parallel-processing computer architecture in order to generate a plurality of partial output files.

3. The method of claim 2, further comprising:
performing, before the dividing the received first data file into the plurality of component data files, at least one preprocessing function with respect to the received first data file;
combining the plurality of partial output files into a single composite output file; and
performing at least one postprocessing function with respect to the single composite output file.

4. The method of claim 1, further comprising applying at least one gatekeeper function to the received first data file in order to determine whether the received first data file is in a proper condition for processing.

5. The method of claim 4, wherein the at least one gatekeeper function includes at least one from among checking a business date, checking a status table, and checking whether a previous feed has been processed in advance.

6. The method of claim 1, further comprising:
accessing a second configuration file that includes at least one second configuration instruction;
extracting each of the at least one second configuration instruction from the accessed second configuration file;
generating a second customized set of computer-readable feed processing instructions by combining each of the extracted at least one second configuration instruction with the predetermined framework set of computer-readable data processing instructions;
processing a second data file by executing the second customized set of feed processing instructions with respect to the second data file; and
outputting a result of the processing the second data file.

7. The method of claim 1, further comprising:
accessing a second configuration file that includes at least one second configuration instruction and at least a third configuration file that includes at least one respective configuration instruction;
extracting each of the at least one second configuration instruction from the accessed second configuration file, and extracting, from each of the at least the third configuration file, each of the at least one respective configuration instruction;
generating a second customized set of computer-readable feed processing instructions by combining each of the extracted at least one second configuration instruction with the predetermined framework set of computer-readable data processing instructions, and generating, for each of the at least the third configuration file, a respective customized set of computer-readable feed processing instructions by combining each of the extracted at least one respective configuration instruction for the corresponding configuration file with the predetermined framework set of computer-readable data processing instructions;
processing a second data file by executing the second customized set of feed processing instructions with respect to the second data file, and processing, for each respective customized set of computer-readable feed processing instructions, a corresponding input data file; and
outputting each of a respective set of results of the processing the second data file and each corresponding input data file.

8. A feed processing device configured to process feed data, comprising:
a communication interface; and
a first processor,
wherein the first processor is configured to:
receive, via the communication interface, a first data file that includes a plurality of rows, each row including a plurality of data items;
access, via the communication interface, a first configuration file that includes at least one first configuration instruction;
extract each of the at least one first configuration instruction from the accessed first configuration file;
generate a first customized set of computer-readable feed processing instructions by combining each of the extracted at least one first configuration instruction with a predetermined framework set of computer-readable data processing instructions;

process the received first data file by executing the first customized set of feed processing instructions with respect to the received first data file; and output, via the communication interface, a result of processing the received first data file.

9. The feed processing device of claim 8, wherein the first processor is further configured to:

divide the received first data file into a plurality of component files;

transmit each of the plurality of component files to a respective component processor that is configured to process the corresponding component file in order to generate a respective partial output file; and receive each respective partial output file from each respective component processor, wherein each respective component processor is arranged in a parallel processing architecture and is further configured to concurrently process the corresponding component file.

10. The feed processing device of claim 9, wherein the first processor is further configured to:

perform, before dividing the received first data file into the plurality of component data files, at least one preprocessing function with respect to the received first data file;

combine each respective partial output file into a single composite output file; and perform with respect to the single composite output file.

11. The feed processing device of claim 8, wherein the first processor is further configured to apply at least one gatekeeper function to the received first data file in order to determine whether the received first data file is in a proper condition for processing.

12. The feed processing device of claim 11, wherein the at least one gatekeeper function includes at least one from among checking a business date, checking a status table, and checking whether a previous feed has been processed in advance.

13. The feed processing device of claim 8, wherein the first processor is further configured to:

access, via the communication interface, a second configuration file that includes at least one second configuration instruction;

extract each of the at least one second configuration instruction from the accessed second configuration file;

generate a second customized set of computer-readable feed processing instructions by combining each of the extracted at least one second configuration instruction with the predetermined framework set of computer-readable data processing instructions;

process a second data file by executing the second customized set of feed processing instructions with respect to the second data file; and output, via the communication interface, a result of processing the second data file.

14. The feed processing device of claim 8, wherein the first processor is further configured to:

access, via the communication interface, a second configuration file that includes at least one second configuration instruction and at least a third configuration file that includes at least one respective configuration instruction;

extract each of the at least one second configuration instruction from the accessed second configuration file, and extract, from each of the at least the third configuration file, each of the at least one respective configuration instruction;

generate a second customized set of computer-readable feed processing instructions by combining each of the extracted at least one second configuration instruction with the predetermined framework set of computer-readable data processing instructions, and generate, for each of the at least the third configuration file, a respective customized set of computer-readable feed processing instructions by combining each of the extracted at least one respective configuration instruction for the corresponding configuration file with the predetermined framework set of computer-readable data processing instructions;

process a second data file by executing the second customized set of feed processing instructions with respect to the second data file, and process, for each respective customized set of computer-readable feed processing instructions, a corresponding input data file; and output, via the communication interface, each of a respective set of results of processing the second data file and each corresponding input data file.

15. A non-transitory computer-readable medium configured to store instructions for implementing a method for processing feed data, wherein when executed, the instuctions cause a computer to:

receive a first data file that includes a plurality of rows, each row including a plurality of data items;

access a first configuration file that includes at least one first configuration instruction;

extract each of the at least one first configuration instruction from the received first configuration file;

generate a first customized set of computer-readable feed processing instructions by combining each of the extracted at least one first configuration instruction with a predetermined framework set of computer-readable data processing instructions;

process the received first data file by executing the first customized set of feed processing instructions with respect to the received first data file; and output a result of the processing the received first data file.

16. The computer-readable medium of claim 15, wherein the instructions further cause the computer to:

divide the received first data file into a plurality of component files; and concurrently process each of the plurality of component files by using a parallel-processing computer architecture in order to generate a plurality of partial output files.

17. The computer-readable medium of claim 16, wherein the instructions further cause the computer to:

perform, before dividing the received first data file into the plurality of component data files, at least one preprocessing function with respect to the received first data file;

combine the plurality of partial output files into a single composite output file; and perform at least one postprocessing function with respect to the single composite output file.

18. The computer-readable medium of claim 15, wherein the instructions further cause the computer to apply at least one gatekeeper function to the received first data file in order to determine whether the received first data file is in a proper condition for processing.

19. The computer-readable medium of claim 18, wherein the at least one gatekeeper function includes at least one from among checking a business date, checking a status table, and checking whether a previous feed has been processed in advance.

20. The computer readable medium of claim 15, wherein the instructions further cause the computer to:
- access a second configuration file that includes at least one second configuration instruction and at least a third configuration file that includes at least one respective configuration instruction;
- extract each of the at least one second configuration instruction from the accessed second configuration file, and extract, from each of the at least the third configuration file, each of the at least one respective configuration instruction;
- generate a second customized set of computer-readable feed processing instructions by combining each of the extracted at least one second configuration instruction with the predetermined framework set of computer-readable data processing instructions, and generate, for each of the at least the third configuration file, a respective customized set of computer-readable feed processing instructions by combining each of the extracted at least one respective configuration instruction for the corresponding configuration file with the predetermined framework set of computer-readable data processing instructions;
- process a second data file by executing the second customized set of feed processing instructions with respect to the second data file, and process, for each respective customized set of computer-readable feed processing instructions, a corresponding input data file; and
- output each of a respective set of results of the processing the second data file and each corresponding input data file.

* * * * *